(12) United States Patent
Arnold et al.

(10) Patent No.: US 6,428,220 B1
(45) Date of Patent: Aug. 6, 2002

(54) PORTABLE BARCODE PRINTER WITH IMPROVED CONTROL AND DISPLAY FOR A SMALL NUMBER OF FUNCTION KEYS

(75) Inventors: Gregory B. Arnold, Centerville; Rex D. Watkins, Franklin; Gary E. Brazier, Brookville; Timothy V. Toth, Dayton, all of OH (US)

(73) Assignee: Monarch Marking Systems, Inc., Miamisburg, OH (US)

( * ) Notice: Subject to any disclaimer, the term of this patent is extended or adjusted under 35 U.S.C. 154(b) by 0 days.

(21) Appl. No.: 09/479,006

(22) Filed: Jan. 7, 2000

(51) Int. Cl.$^7$ .................................................. B41J 3/36
(52) U.S. Cl. ........................................ 400/88; 400/103
(58) Field of Search ................................. 400/88, 103

(56) References Cited

U.S. PATENT DOCUMENTS

| | | | | |
|---|---|---|---|---|
| 4,734,710 A | * | 3/1988 | Sato et al. | 346/76 |
| 5,092,688 A | * | 3/1992 | Haennelt et al. | 400/120 |
| 5,497,455 A | * | 3/1996 | Suga et al. | 395/159 |
| 5,503,483 A | * | 4/1996 | Petteruti et al. | 400/88 |

* cited by examiner

Primary Examiner—Andrew H. Hirshfeld
Assistant Examiner—Charles H. Nolan, Jr.
(74) Attorney, Agent, or Firm—McAndrews, Held & Malloy, Ltd.

(57) ABSTRACT

A portable, on-line barcode printer has a very small number of variable function keys, each of which is actuable to perform a large number of non-data entry functions for monitoring various components, performing diagnostic testing and setting up the operation of the printer. A display is positioned in association with the function keys and provides both a message section for displaying a text or pictorial message in association with a current mode of operation and an icon section for displaying an icon in association with each of the function keys wherein each icon symbolizes a non-data entry function selectable by actuation of the associated key in the current mode. A controller enables one or more of the function keys in each of a plurality of modes in the printer and controls the message and icon set depicted in each mode so as to change the function of each of the variable function keys.

15 Claims, 5 Drawing Sheets

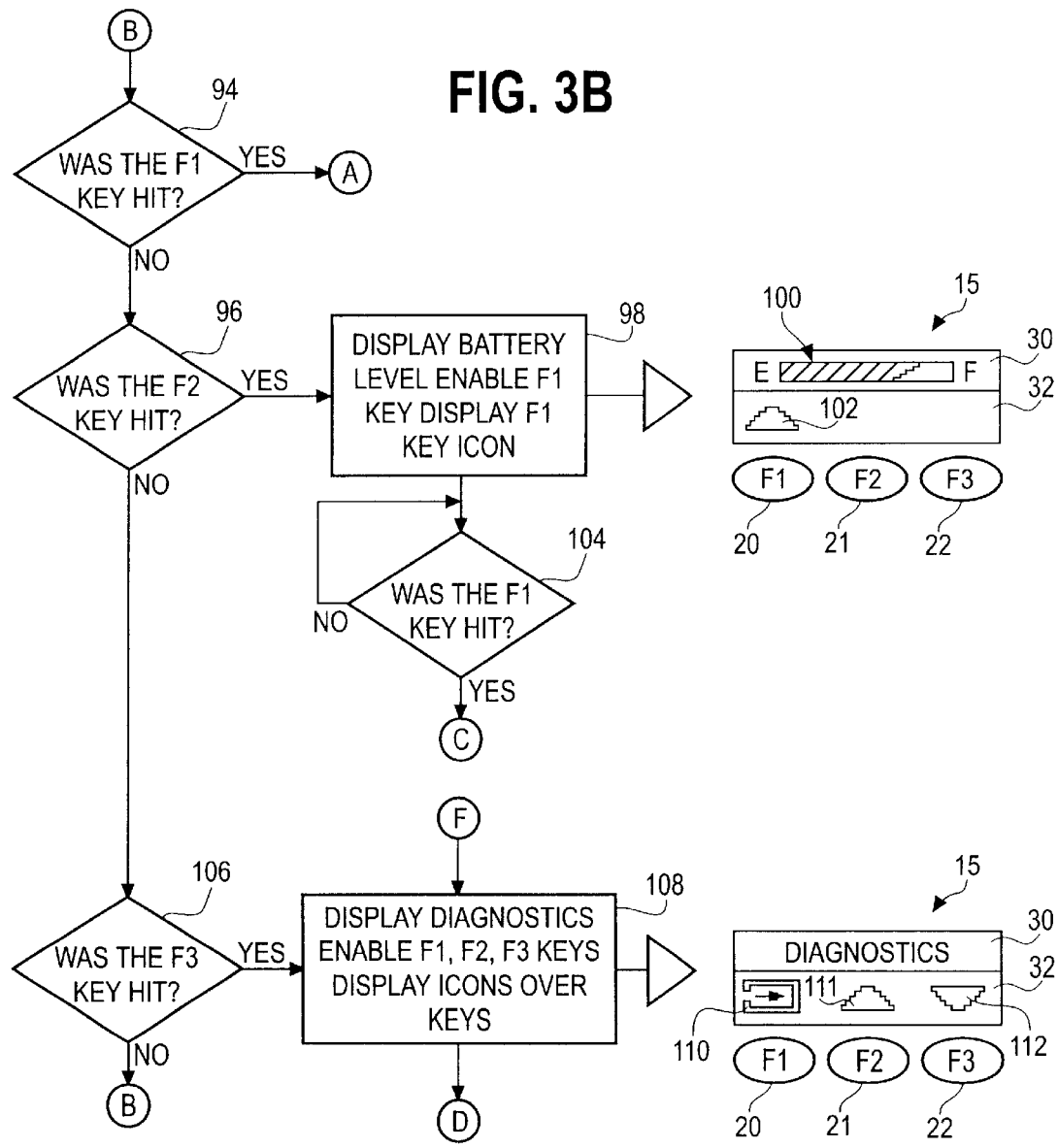

PORTABLE BARCODE PRINTER WITH IMPROVED CONTROL AND DISPLAY FOR A SMALL NUMBER OF FUNCTION KEYS

FIELD OF THE INVENTION

The present invention is directed to a portable barcode printer and more particularly to such a printer having a small number of function keys each actuable in a plurality of modes to select a plurality of non-data entry functions and a display to provide a message and icon set to indicate the selectable function of a key in a current mode and monitoring information.

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

Portable on-line barcode printers are known in which the printers receive data to be printed on a tag, label or the like from an external host device. The external device may be a data collector, a remote host computer, or the like. The printers receive the data via a hard wired connection or wireless communications such as radio frequency (RF) and infra-red (IR) communications. To minimize size, the printers include a small number of keys, for example, four or five keys each having a fixed function. In order to monitor the operation of these printers, status information is typically transferred from the printer to the host upon request by the host device. Typically, a user of these barcode printers cannot interrupt the printing operation of the barcode printer to monitor various components thereof or perform diagnostics to troubleshoot on site. Moreover, the error messages received by the host are typically numerically encoded. To determine what the error is, a manual must be consulted to correlate the numerical code to a given printer problem.

BRIEF SUMMARY OF THE INVENTION

In accordance with the present invention, the disadvantages of prior portable barcode printers having a limited number of keys are overcome. The portable barcode printer of the present invention has a very small number of functions keys, each of which is actuable to perform a large number of non-data entry functions for monitoring or setting up printer operations and a display positioned in association with the function keys to provide a message and icon set indicating the selectable function of a key in a current mode as well as operating information.

More particularly, the portable barcode printer includes a number of function keys, each of which is actuable when enabled in a plurality of modes to select a plurality of non-data entry functions of the printer. A display is mounted in association with the function keys wherein the display has a message section for displaying a text or pictorial message in association with a current mode and an icon section for displaying an icon in association with each of the function keys. Each of the icons symbolizes a non-data entry function selectable by actuation of the associated key in the current mode indicated by the message section. The message section not only indicates the current mode of operation but provides printer operation information to the user as well. A controller is provided for enabling one or more of the function keys in each of a plurality of modes of the printer and for controlling the message and the icon set displayed in association with each enabled function key.

The use of a display with a combination message section and icon section in association with a small number of function keys allows a user to select and monitor a large number of components and/or operations of a portable barcode printer without the need for an external device and without increasing the number of keys. Moreover, the combination of a message section and icon section of the display aids the user in interpreting the meaning of the icons for increased ease of use as well as increased functionality. These and other advantages and novel features of the present invention, as well as details of an illustrated embodiment thereof, will be more fully understood from the following description and drawings.

BRIEF DESCRIPTION OF THE SEVERAL VIEWS OF THE DRAWING

FIGS. 3A–3C is a flow chart illustrating the control of the display and keyboard of the portable barcode printer of FIG. 1.

DETAILED DESCRIPTION OF THE INVENTION

Figure 1:
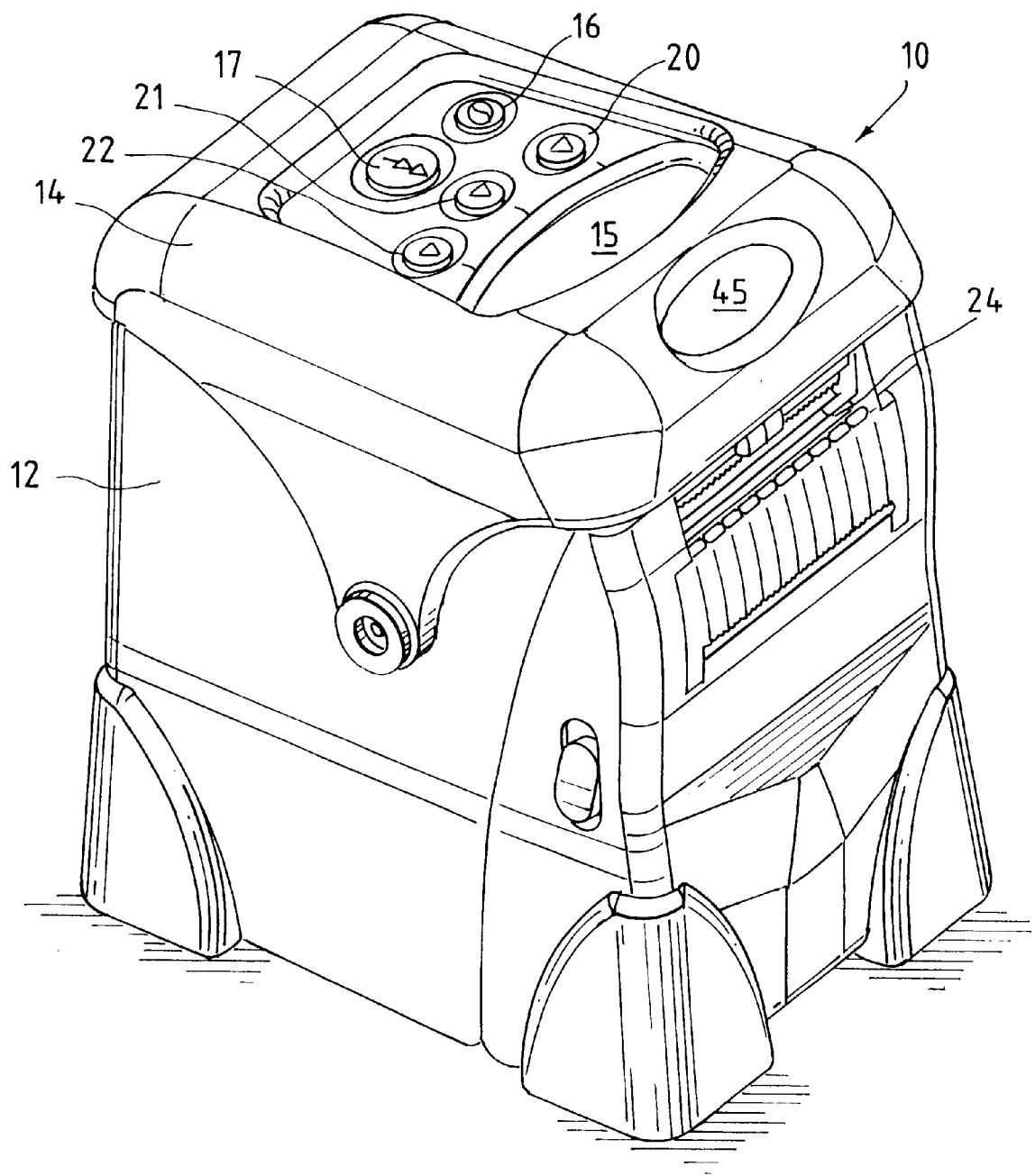
FIG. 1 is a perspective view of the portable barcode printer of the present invention.

A portable barcode printer 10 as shown in FIG. 1 prints barcodes and/or alpha-numeric characters on a web of record members such as labels, tags or the like contained in a printer housing 12. The housing 12 includes a top cover on which is mounted a display 15, a pair of fixed function keys 16, 17 and a set of variable function keys 20, 21 and 22. The fixed function key 16 is an on/off switch whereas the fixed function key 17 is a feed key that is used to advance the web of record members through the printer past a printhead contained therein so that the label exits an opening 24 in the housing after the desired information is printed thereon.

Figure 3A:
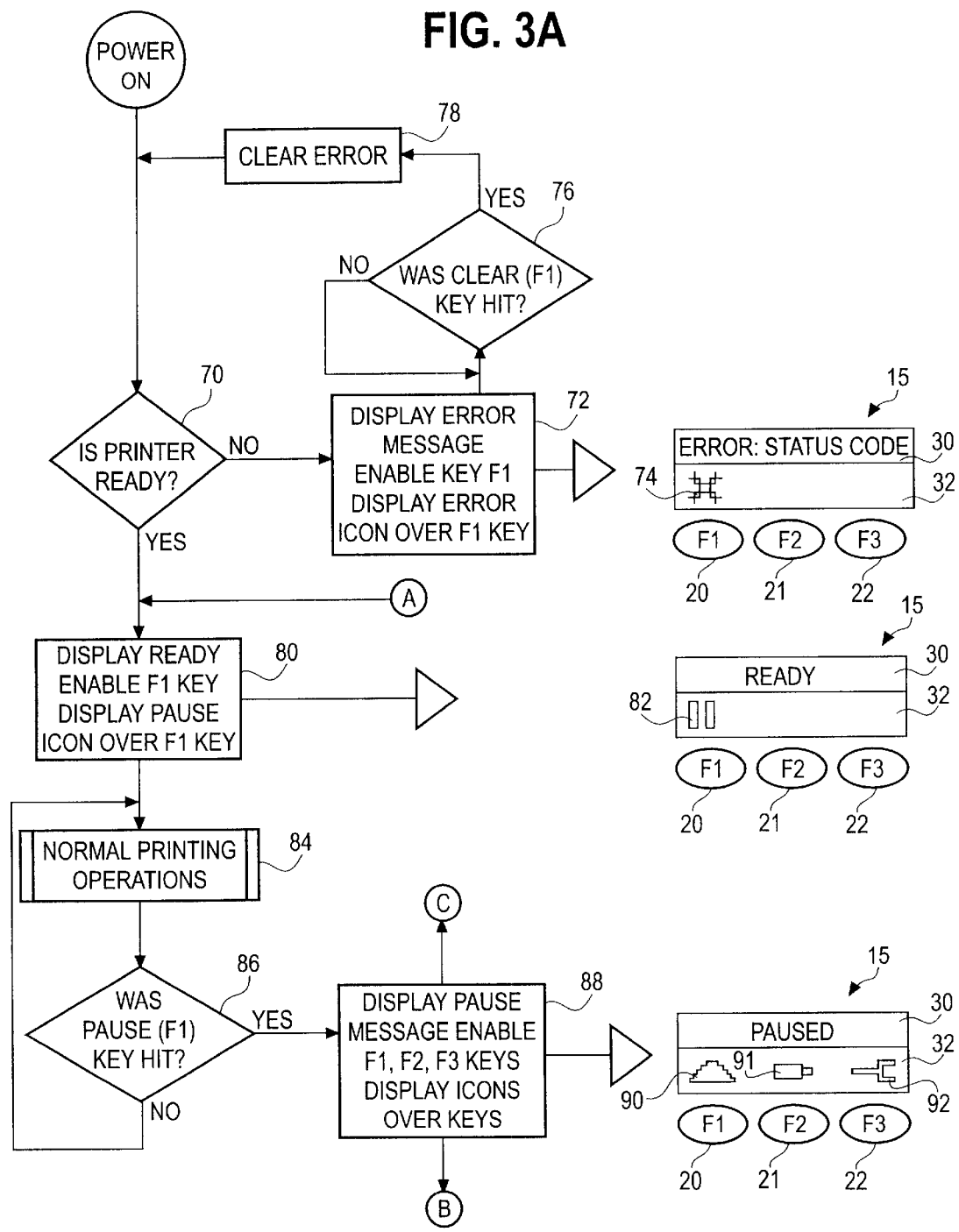
Figure 3C:
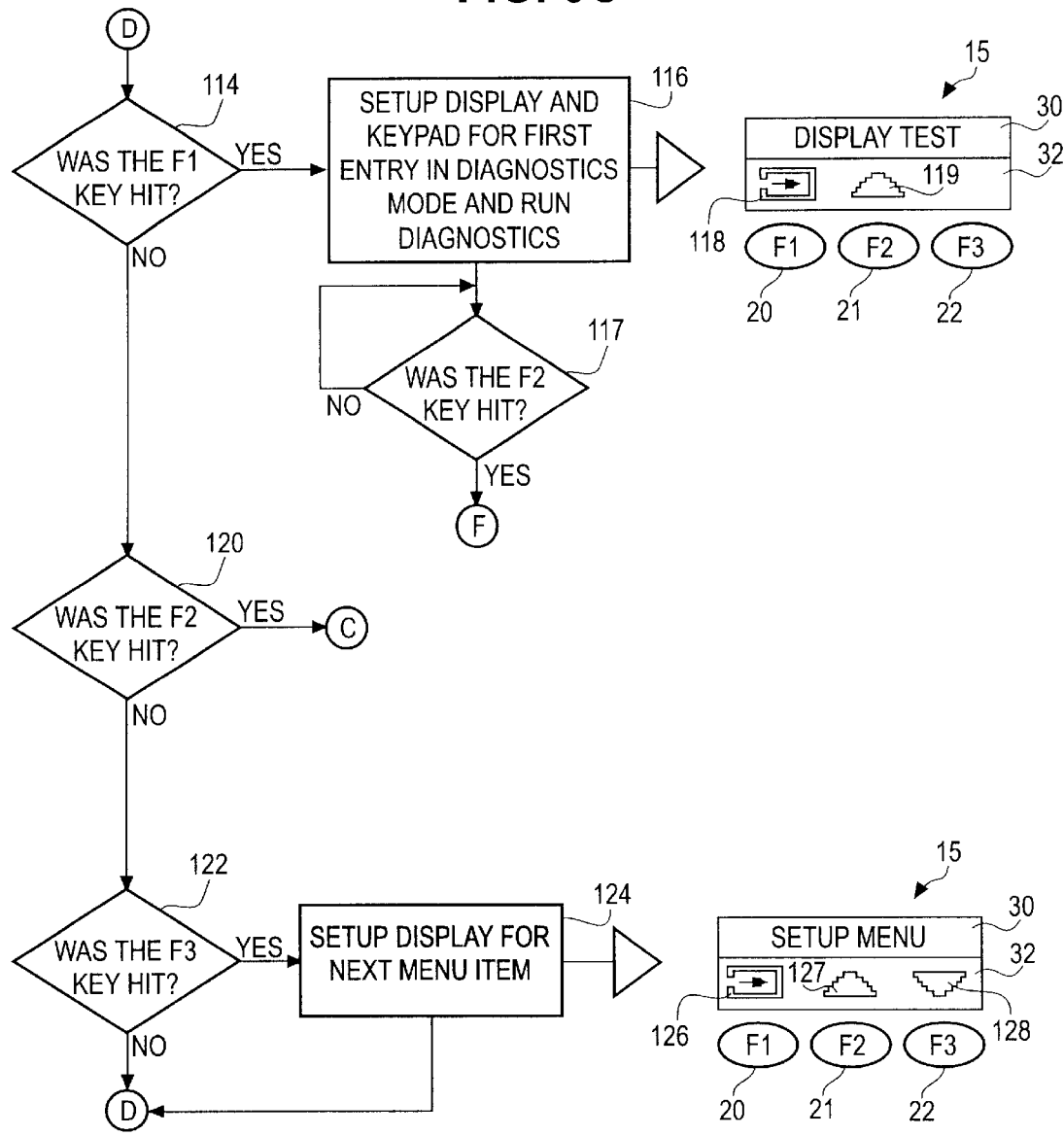

Each of the variable function keys 20, 21 and 22 is associated with a large number of functions which are identified by the display 15. More particularly, the display 15, as shown in FIG. 3, includes a message section 30 and an icon section 32. The message section displays a text and/or pictorial message in association with a current mode of operation as described in detail below. The icon section 32 of the display depicts an icon in association with each variable function key 20–22 that is enabled in the current mode. The display 15 is positioned with respect to the variable function keys 20–22 such that an icon can be displayed adjacent to each of the function keys wherein each icon symbolizes a non-data entry function selectable by actuation of the associated key in the current mode indicated by the message section. If an icon is not depicted adjacent to a function key in the icon section 32, then that function key is not enabled in the current mode. When the user actuates an enabled function key 20–22, a controller of the barcode printer 10 is responsive thereto to change the message or information depicted in the message section 30 of the display 15 as well as to change the icons associated with each of the enabled function keys.

The message section 30 in combination with the individual icons of display section 32 provides significantly more information to the user than heretofore provided so that the user can readily understand the meaning of a particular function key in the current printer mode. The combination message and icon set with the variable function keys allows a very small number of keys to select an extremely large number of non-data entry functions. The non-data entry functions selectable by the variable functions of the barcode printer of the present invention include component or operation monitoring functions, diagnostics, setup selections, etc. The number of functions that can be associated with each of the function keys 20–22 is limited only by the size of the printer's memory. Thus, without increasing the size or complexity of the printer and in particular the keys thereof, an extremely large number of functions can be selected by the user but in an extremely user friendly manner. The combination message and icon display eliminates the need for instruction manuals, etc. in order to set up the printer or to monitor printer operations. It further allows the user to decipher diagnostics without having to interpret numeric codes which have been used in the past to identify a particular error or printer problem. For example, if an error such as a paper jam is detected, the message section 30 will identify the particular error or problem displaying the words "paper jam" as opposed to a numerical code representing the problem. Moreover, the use of the function keys and displays allows the barcode printer itself to provide information to the user as to its operations. This feature significantly simplifies the host application which in the past had to handle the decoding of printer status codes etc.

Figure 2:
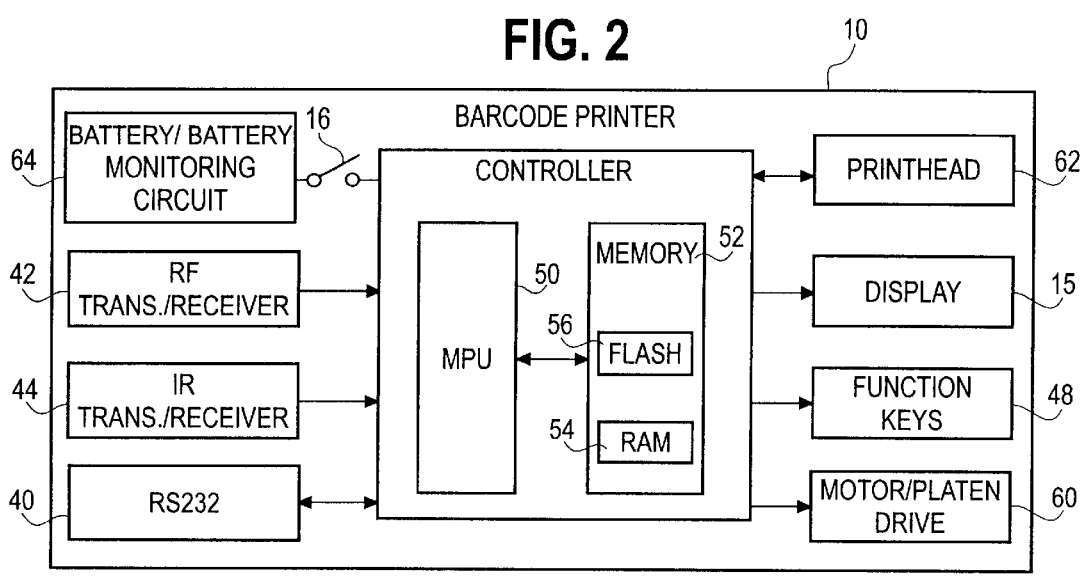
FIG. 2 is a block diagram of the portable barcode printer shown in FIG. 1.

The portable barcode printer 10 is an on-line printer in which print data is received from an external device such as a data collector or a remote host computer. As shown in FIG. 2, the barcode printer 10 may receive the print data via a hard wired connection such as a RS 232 communication port 40. Alternatively, the barcode printer 10 may receive the print data via wireless communications. For example, the barcode printer 10 may include a radio frequency (RF) communication interface with a transmitter and receiver 42. Alternatively, or in addition thereto, the barcode printer 10 can utilize an infra-red (IR) communication interface 44. If infra-red communications are employed, the housing 12 of the barcode printer includes a window 45 through which the IR transmissions can pass. Because the barcode printer 10 is an on-line printer, receiving print data from an external device, the printer does not need a full-size keyboard for data entry.

The barcode printer 10 includes a controller with at least one microprocessor 50 that operates in accordance with software stored in a flash ROM 56. The flash ROM 56 also, preferably stores font and format information as well. The memory 52 of the controller also includes a random access memory 54 used as a scratch pad memory and for storing print data received from the external host device. In response to the print data and an on-line print command, the microprocessor 50 controls a motor 60 coupled to a platen through a platen drive mechanism so as to drive the platen and thereby feed the web of record members past the printhead 62. As the web of record members is moved past the printhead 62, the microprocessor 50 controls the printhead to print the data in a particular font and format. The barcode printer 10 is preferably powered by a battery 64 wherein the controller can monitor the battery level.

The microprocessor 50 enables the function keys 20, 21 and 22 in a plurality of modes and controls the display 15 in accordance with the flow chart depicted in FIG. 3. When the barcode printer 10 is turned on by actuation of the key 16, the microprocessor 50 at block 70 determines whether the printer is ready for printing operations. If not, the microprocessor proceeds to block 72 to display an error message such as "Error: Status Code" in the message section 30 of the display 15. At block 72, the microprocessor 50 also enables the F1 function key 20 and displays an error icon over the F1 key to identify the function thereof. The icon 74 depicts a "Clear" function associated with the F1 function key 20 in the error status mode identified in the message section 30 of the display 15. From block 72, the microprocessor proceeds to block 76 to determine whether the function key 20 was actuated so as to clear the error. If so, the microprocessor 50 proceeds to block 78 to clear the error message and thereafter returns to block 70. If the printer is ready for printing operations, the microprocessor 50 proceeds from block 70 to block 80. At block 80, the microprocessor controls the display 15 to display a "Ready" message in the message section 30 of the display. At block 80, the microprocessor 50 also enables the F1 function key 20 and displays a "Pause" icon 82 adjacent to the F1 key to identify the function associated therewith in the ready mode identified in the message section 30. Actuation of the function key 20 when the "Pause" icon 82 is displayed in association therewith will cause normal printing operations to be paused or interrupted so that various components or operations of the printer can be monitored or to allow diagnostic tests or settings of the printer to be changed.

The printer 10 will perform normal printing operations at block 84 in the ready mode wherein the microprocessor 50 controls the printhead to print the data received on-line from an external device onto a label or tag as the label or tag is moved past the printhead 62. From block 84, the microprocessor proceeds to block 86 to determine whether the F1 function key 20 has been actuated when the "Pause" icon 82 is displayed in association therewith. If so, the microprocessor proceeds to block 88 to display a "Paused" message. The microprocessor 50 at block 88 also enables each of the function keys 20, 21 and 22 and displays an icon in association with each of the respective keys so as to identify the function which may be selected by actuation of the respective key in the "Paused" mode. More particularly, the microprocessor 50 displays an icon 90 in the form of an upward pointing arrow in association with the F1 function key 20 to identify a function that returns the printer to the previous mode or display screen if the F1 function key is actuated. The microprocessor 50 displays a battery icon 91 in association with the F2 function key 21 so as to indicate a battery monitoring function associated with the F2 key. A diagnostic icon 92 is displayed in association with the F3 function key 22 so as to identify a diagnostic function in association with the F3 key.

If the microprocessor 50 determines at block 94 that the F1 key 20 was actuated in the "Paused" mode, the microprocessor proceeds from block 94 to block 80 so as to resume the "Ready" mode during which normal printing operations can occur. If the microprocessor determines at block 96 that the F2 function key was actuated, the microprocessor 50 proceeds to block 98. At block 98, the microprocessor displays a pictorial message 100 in the message section of the display 30. The pictorial message 100 indicates the level of charge of the printer's battery wherein "E" represents empty and "F" represents a full battery charge. At block 98, the microprocessor 50 changes the icon set depicted in the icon section of the display 32 so as to indicate that only the F1 function key is enabled. In this mode, the icon 102 which is, for example, an up arrow icon, indicates the function associated with the F1 key 20 in the battery level monitoring mode is the return to the previous mode function. From block 98, the microprocessor proceeds to block 104 to determine whether the F1 key 20 was actuated or not. When the F1 key is actuated, the microprocessor 50 returns to the previous mode at block 88.

If the microprocessor determines at block 106 that the F3 function key was actuated while the printer is in the "Paused" mode, the microprocessor proceeds to block 108 to display in the message section 30 of the display 15 a "Diagnostics" message. At block 108, the microprocessor 50 also enables each of the function keys 20, 21 and 22 and displays icons identifying the function of the key when actuated in the diagnostic mode. In particular, the icon 110 associated with the F1 function key 20 identifies entry into a first diagnostic mode which may be a display test for example. The icon 111 associated with the F2 function 21 is the up arrow icon identifying the function of the F2 key as returning to the previous menu item or mode. The icon 112 associated with the F3 function key 22 is a down arrow icon which the user can select to advance the menu to the next item which may be, for example, a setup display menu. From block 108, the microprocessor 50 proceeds to block 114 to determine whether the F1 function key 20 was actuated in the diagnostics mode. If so, the microprocessor 50 proceeds to block 116 to set up the display and keypad entry for the first diagnostic mode test which is the display test. In this mode, the microprocessor 50 controls the display 15 to depict a "Display Test" message in the section 30 of the display. The microprocessor 50 also enables the F1 and F2 function keys, as well as controlling the display 15 to depict respective icons 118 and 119 in the icon section 32 in association with the enabled function keys. In the display test mode, the icon 118 identifies an "enter" function for the key 20 so as to start the running of the display test. The up arrow icon 119 in the display test mode associated with the F2 function key 21 indicates a return to the previous mode or menu item. If the F2 function key 21 was actuated in the "Diagnostics" mode, the microprocessor 50 will return to the previously displayed menu item or mode which is the "Paused" mode at block 88. If the microprocessor determines at block 122 that the F3 function key 22 was actuated while in the "Diagnostics" mode, the microprocessor 50 will proceed to block 124.

The microprocessor 50 at block 124 controls the display 15 to depict a "Setup Menu" message in the section 30 of the display. At block 124, the microprocessor also enables each of the function keys 20, 21 and 22 and displays an icon in association with each of these function keys to identify the function of the associated key. In particular, an enter icon 126 is displayed in association with the F1 function key 20 to signify that upon actuation of the F1 key, the printer will enter a setup mode. In the setup mode, an up arrow icon 127 associated with the F2 function key will allow the user to scroll to previously displayed setup menu items; whereas the down arrow icon 128 will allow the user to scroll to the next setup menu item. The various items that may be initialized during the setup mode of operation include a communication port setting, print contrast adjustment setting, the label and/or print positions, etc. If the communication port setup item is selected by actuation of the associated function key 20, 21 or 22, the microprocessor 50 controls the display 15 to depict a first menu choice for the communication port setting in the message section 30. The user can select this menu item by actuating the function key 20 associated with the "enter" icon. The user can scroll to the next setting selection for the communication port by actuating the F3 function key in association with the down arrow icon 128 or the user can scroll to a previous setting utilizing the F2 function key 21. Other items can be setup in a similar manner using the various function keys in the setup mode.

It should be appreciated that the message and icon set displayed in association with the enabled function keys allows each function key to have as many functions as desired. The above described message and icon sets are merely a few examples of the vast possibilities in accordance with the present invention. Even though an extremely large number of functions are available to the user, the keyboard remains extremely simple with a small number of keys. The printer of the present invention is also user friendly because the message section provides information in addition to the icons depicted in the section 32 to aid the user in interpreting the icons. Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A portable barcode printer with a limited number of keys to select a plurality of non-print data entry functions, comprising:

a number of function keys each of which is actuable when enabled in a plurality of modes to select a plurality of non-print data entry functions of the printer including printer operation monitoring functions;

a display mounted in association with the function keys, said display having a message section for displaying a text or pictorial message in association with a current mode and an icon section for displaying an icon in association with each of the function keys, each icon symbolizing a non-print data entry function selectable by actuation of the associated key in the current mode indicated by the message section; and a controller for enabling one or more of the function keys in each of a plurality of modes of the printer and for controlling the message displayed in the message section of the display and the icon displayed in association with each enabled function key.

2. A portable barcode printer as recited in claim 1 wherein the controller is responsive to the actuation of an enabled function key to control the display to depict a different message and different icons in association with one or more enabled keys.

3. A portable barcode printer as recited in claim 1 including at least one mode wherein fewer than all the function keys are enabled.

4. A portable barcode printer as recited in claim 1 including a first icon displayable in association with a function key during one mode to indicate the ability to interrupt normal printing operations, the controller being responsive to the selection of the function key associated with the first icon to interrupt the operation of the printer and to display different icons in association with the enabled keys.

5. A portable barcode printer as recited in claim 1 wherein the printer is battery powered and including a battery icon displayable in association with a function key during a mode to indicate the ability to monitor the level of the battery, the controller being responsive to the selection of the function key associated with the battery icon to control the display to indicate in the message section the level of the battery and to display different icons in association with the enabled keys.

6. A portable barcode printer as recited in claim 1 including a diagnostic icon displayable in association with a function key during a mode to indicate the ability to perform one or more diagnostic tests, the controller being responsive to the selection of the function key associated with the diagnostic icon to display a diagnostic message in the message section and one or more icons identifying selectable diagnostic tests.

7. A portable barcode printer as recited in claim 1 including an advance menu icon displayable in association with a function key in one mode to indicate the ability to advance the message and icons displayed to a next message and icon set.

8. A portable barcode printer as recited in claim 1 including a previous menu icon displayable in association with a function key in one mode to indicate the ability to display a previous message and icon set.

9. A portable barcode printer with a limited number of keys to select a plurality of non-print data entry functions, comprising:

a number of function keys each of which is actuable when enabled in a plurality of modes to select a plurality of non-print data entry functions of the printer;

a display mounted in association with the function keys, said display having a message section for displaying a text or pictorial message in association with a current mode and an icon section for displaying an icon in association with each of the function keys, each icon symbolizing a non-print data entry function selectable by actuation of the associated key in the current mode indicated by the message section, the selectable functions including an interrupt function to pause normal printing operations and a plurality of monitoring operations to monitor or test components of the printer; and a controller for enabling one or more of the function keys in each of a plurality of modes of the printer and for controlling the message displayed in the message section of the display and the icon displayed in association with each enabled function key.

10. A portable barcode printer as recited in claim 9 wherein the controller is responsive to the actuation of an enabled function key to control the display to depict a different message and different icons in association with one or more enabled keys.

11. A portable barcode printer as recited in claim 9 including at least one mode wherein fewer than all the function keys are enabled.

12. A portable barcode printer as recited in claim 9 wherein the printer is battery powered and including a battery icon displayable in association with a function key during a mode to indicate the ability to monitor the level of the battery, the controller being responsive to the selection of the function key associated with the battery icon to control the display to indicate in the message section the level of the battery and to display different icons in association with the enabled keys.

13. A portable barcode printer as recited in claim 9 including a diagnostic icon displayable in association with a function key during a mode to indicate the ability to perform one or more diagnostic tests, the controller being responsive to the selection of the function key associated with the diagnostic icon to display a diagnostic message in the message section and one or more icons identifying selectable diagnostic tests.

14. A portable barcode printer as recited in claim 9 including an advance menu icon displayable in association with a function key in one mode to indicate the ability to advance the message and icons displayed to a next message and icon set.

15. A portable barcode printer as recited in claim 9 including a previous menu icon displayable in association with a function key in one mode to indicate the ability to display a previous message and icon set.

* * * * *